(12) United States Patent
Jiang et al.

(10) Patent No.: US 12,078,527 B2
(45) Date of Patent: Sep. 3, 2024

(54) DIFFERENTIAL COTDR DISTRIBUTED ACOUSTIC SENSING DEVICE AND METHOD BASED ON HETEROGENEOUS DOUBLE-SIDEBAND CHIRPED-PULSES

(71) Applicant: TIANJIN UNIVERSITY, Tianjin (CN)

(72) Inventors: Junfeng Jiang, Tianjin (CN); Tiegen Liu, Tianjin (CN); Zhe Ma, Tianjin (CN); Shuang Wang, Tianjin (CN); Kun Liu, Tianjin (CN); Zhenyang Ding, Tianjin (CN); Xuezhi Zhang, Tianjin (CN); Wenjie Chen, Tianjin (CN); Guanhua Liang, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 207 days.

(21) Appl. No.: 17/630,408

(22) PCT Filed: Jan. 22, 2020

(86) PCT No.: PCT/CN2020/073694
§ 371 (c)(1),
(2) Date: Jan. 26, 2022

(87) PCT Pub. No.: WO2021/093181
PCT Pub. Date: May 20, 2021

(65) Prior Publication Data
US 2022/0283021 A1   Sep. 8, 2022

(30) Foreign Application Priority Data

Nov. 13, 2019 (CN) .......................... 201911107643.5

(51) Int. Cl.
*G01H 9/00* (2006.01)
*G01D 5/353* (2006.01)
(Continued)

(52) U.S. Cl.
CPC ......... *G01H 9/004* (2013.01); *G01D 5/35329* (2013.01); *G01D 5/35361* (2013.01);
(Continued)

(58) Field of Classification Search
CPC .......... G01H 9/004; G01H 9/00; G01H 1/006; G01D 5/35329; G01D 5/35361; G01N 29/2418; G01N 2291/0423
(Continued)

(56) References Cited

U.S. PATENT DOCUMENTS

2022/0283021 A1 * 9/2022 Jiang ..................... G01H 9/004

FOREIGN PATENT DOCUMENTS

CN   102628698 A * 8/2012
CN   104567960 A * 4/2015
(Continued)

OTHER PUBLICATIONS

International Search Report of PCT/CN2020/073694.
Written Opinion of PCT/CN2020/073694.

*Primary Examiner* — Stephanie E Bloss
*Assistant Examiner* — Kevin C Butler

(57) ABSTRACT

The present invention discloses a differential COTDR distributed acoustic sensing device based on heterogeneous double-sideband chirped-pulses of the invention, comprising a light source (1), a 1×2 polarization-maintaining optical-fiber coupler (2), a dual Mach-Zehnder electro-optical modulator (3), an arbitrary waveform generator (4), a first low noise microwave amplifier (5), a second low noise microwave amplifier (6), an electro-optical modulator bias control panel (7), a 1×2 optical-fiber coupler (8), an erbium-doped optical-fiber amplifier (9), an optical-fiber filter (10), an optical-fiber circulator (11), a sensing optical fiber (12), a tricyclic polarization controller (13), a 2×2 optical-fiber coupler (14), a balanced photoelectric detector (15), a data (Continued)

acquisition card (16) and a processing unit (17). The present invention combines heterogeneous double-sideband chirped-pulse modulation and coherent light time-domain reflection technology, so as to double the sensitivity of the to-be-measured acoustic wave signal and to suppress common-mode noise, and further improves SNR.

2 Claims, 2 Drawing Sheets

(51) Int. Cl.
    *G01H 1/00*    (2006.01)
    *G01N 29/24*    (2006.01)

(52) U.S. Cl.
    CPC ............... *G01H 1/006* (2013.01); *G01H 9/00* (2013.01); *G01N 29/2418* (2013.01); *G01N 2291/0423* (2013.01)

(58) Field of Classification Search
    USPC .......................................................... 73/655
    See application file for complete search history.

(56) References Cited

FOREIGN PATENT DOCUMENTS

| | | | | | |
|---|---|---|---|---|---|
| CN | 104977030 | A | * | 10/2015 | |
| CN | 105092014 | A | * | 11/2015 | |
| CN | 108286992 | A | * | 7/2018 | ......... G01D 5/35329 |
| CN | 108507663 | A | * | 9/2018 | |
| CN | 112118043 | A | * | 12/2020 | ........... H04B 10/071 |
| CN | 112327276 | A | * | 2/2021 | ............. G01S 7/484 |
| CN | 113810098 | A | * | 12/2021 | |
| CN | 113810099 | A | * | 12/2021 | |
| CN | 113835002 | A | * | 12/2021 | |
| CN | 111562564 | B | * | 4/2022 | ............. G01S 17/34 |
| CN | 114499670 | A | * | 5/2022 | |
| CN | 114696899 | A | * | 7/2022 | |
| CN | 114978326 | A | * | 8/2022 | ......... G02B 6/12004 |
| CN | 115622626 | A | * | 1/2023 | |
| CN | 116907627 | A | * | 10/2023 | |
| CN | 116380140 | B | * | 11/2023 | ......... G01D 5/35361 |
| CN | 117030000 | A | * | 11/2023 | |
| WO | WO-2012156978 | A1 | * | 11/2012 | |

\* cited by examiner

DIFFERENTIAL COTDR DISTRIBUTED ACOUSTIC SENSING DEVICE AND METHOD BASED ON HETEROGENEOUS DOUBLE-SIDEBAND CHIRPED-PULSES

CROSS-REFERENCE TO RELATED APPLICATIONS

This Application is a national stage application of PCT/CN2020/073694. This application claims priorities from PCT Application No PCT/CN2020/073694, filed Jan. 22, 2020, and from the Chinese patent application 201911107643.5 filed Nov. 13, 2019, the content of which are incorporated herein in the entirety by reference.

TECHNICAL FIELD

The invention relates to the field of distributed optical-fiber acoustic sensing detection, and in particular, to a differential COTDR distributed acoustic sensing device and a method based on heterogeneous double-sideband chirped-pulses, which can be used for seismic wave measurement, pipeline detection, etc.

BACKGROUND ART

The acoustic array detection technology receives great attention for its wide application in the fields of seismic wave measurement, marine acoustic tomography, aircraft noise analysis, oil well exploration and monitoring, etc. Traditional discretely-structured microphone arrays are mainly electronic sensors, and they are significantly limited due to the strict synchronous acquisition requirement. Severe environment, including high temperature and high humidity as well as electromagnetic interference, etc., also brings great challenges to the reliable work of traditional microphone arrays. However, the distributed optical-fiber acoustic sensing (DAS) technology aims to sense dynamic strains in an environment with a distance of dozens of kilometers and even more than one hundred kilometers by optical fibers, which is an effective tool for monitoring quantitative signals in the environment. In order to quantitatively recover the waveform of an acoustical signal, besides the measurement of position, amplitude and frequency, a DAS system is also required to extract the complete phase change information along with a sensing optical fiber. A phase-sensitive optical time-domain reflectometer based on Rayleigh back scattering is usually used for DAS. Y. Koyamada, et al. have achieved the distributed strain and temperature sensing measurement by combining a frequency-tunable light source with a coherent light time-domain reflector to process a back Rayleigh scattering time-domain signal. However, the experiment is repeated once for regulating each light frequency of the frequency-tunable light source, the measurement efficiency is greatly reduced. J. Pastor-Graells, et al. have achieved the dynamic strain measurement by using a chirped-pulse as a detection light pulse in combination with a direct detection solution; however, for the analog chirped pulse-modulated through changing a drive current of a laser, the instantaneous frequency is required to be calibrated constantly, and this solution has a relatively low signal-to-noise ratio for direct detection.

SUMMARY OF THE INVENTION

In order to generate high-quality chirped-pulse light signals and achieve acoustic wave signal measurement with high sensitivity and high signal-to-noise ratio, the invention provides a differential COTDR distributed acoustic sensing device and a method based on heterogeneous double-sideband chirped-pulses. Heterogeneous double-sideband chirped-pulse modulation and coherent light time-domain reflection technology are combined to double the sensitivity of the to-be-measured acoustic wave signal under the condition of not increasing any power consumption through a digital differential calculation method, and to suppress common-mode noise, so that an efficient convenient technical solution is provided for the field of seismic wave measurement. Therefore, the invention has wide application prospect.

The differential COTDR distributed acoustic sensing device based on heterogeneous double-sideband chirped-pulses of the invention, comprises a light source, a 1×2 polarization-maintaining optical-fiber coupler, a dual Mach-Zehnder electro-optical modulator, an arbitrary waveform generator, a first low noise microwave amplifier, a second low noise microwave amplifier, an electro-optical modulator bias control panel, a 1×2 optical-fiber coupler, an erbium-doped optical-fiber amplifier, an optical-fiber filter, an optical-fiber circulator, a sensing optical fiber, a tricyclic polarization controller, a 2×2 optical-fiber coupler, a balanced photoelectric detector, a data acquisition card and a processing unit.

The light source is connected with an input end of the 1×2 polarization-maintaining optical-fiber coupler; the 1×2 polarization-maintaining optical-fiber coupler comprises two output ends, one output end is connected with the dual Mach-Zehnder electro-optical modulator, the 1×2 optical-fiber coupler, the erbium-doped optical-fiber amplifier and the optical-fiber filter in turn, the other output end is connected with the tricyclic polarization controller, the 2×2 optical-fiber coupler and the balanced photoelectric detector in turn, and then the two output ends are connected with the optical-fiber circulator and the sensing optical fiber in turn through a common output end.

The output end of the 1×2 optical-fiber coupler is divided into two paths, one path of the output end is connected with a photoelectric detector on the electro-optical modulator bias control panel.

The arbitrary waveform generator is used for generating a heterogeneous digital chirped pulse electrical-signal with an upper-sideband frequency from $f_{upper}^{start}$ to $f_{lower}^{start}$ and a lower-sideband from $f_{lower}^{start}$ to $f_{lower}^{end}$, which is divided into two paths of quadrature outputs I and Q, and the output data enter the processing unit.

The electro-optical modulator bias control panel is used for extracting and feeding back the modulated heterogeneous chirped-pulse light signals so as to main a preset working condition stably for a long time.

The first low noise microwave amplifier and the second low noise microwave amplifier are used for amplifying the two paths of quadrature outputs I and Q and then loading to the dual Mach-Zehnder electro-optical modulator respectively, so as to modulate and generate a heterogeneous pulse with an upper sideband as a positive chirp and a lower sideband as a negative chirp, which is used as a detection light pulse.

The balanced photoelectric detector is connected with the data acquisition card, and the data acquired by the data acquisition card enter the processing unit.

The invention provides a differential COTDR distributed acoustic sensing method based on heterogeneous double-sideband chirped-pulses, comprising the following steps:

by the light source, emitting a continuous laser with a light frequency of $f_0$, and then dividing the continuous laser into two paths after passing the 1×2 polarization-maintaining optical-fiber coupler, wherein one path of light is used as a signal light while the other path of light is used as a local reference light;

by the arbitrary waveform generator, generating a heterogeneous digital start end chirped-pulse electrical-signal with an upper-sideband frequency from $f_{upper}^{start}$ to $f_{upper}^{end}$ and a lower-sideband frequency from $f_{lower}^{start}$ to $f_{lower}^{end}$ and then dividing the electrical signal into two paths of quadrature outputs I and Q and loading to the dual Mach-Zehnder electro-optical modulator after being amplified by the first low noise microwave amplifier and the second low noise microwave amplifier respectively, so as to modulate and generate a heterogeneous pulse with an upper sideband as a positive chirp and a lower sideband as a negative chirp, which is used as a detection light pulse;

dividing the heterogeneous chirped-pulse into two paths by the 1×2 optical-fiber coupler, wherein one path of output optical-fiber is connected to the photoelectric detector on the electro-optical modulator bias control panel for extracting and feeding back the modulated heterogeneous chirped-pulse light signal, so as to maintain the preset working condition stably for a long time; the other path is used as a detection light pulse and is injected into the sensing optical fiber after successively passing the erbium-doped optical-fiber amplifier, the optical-fiber filter and the optical-fiber circulator; generating, by the heterogeneous chirped-pulse light signal, back Rayleigh scattering light along the passing optical fiber and returning to the demodulation light path along the optical fiber; and the back-scattering heterogeneous chirped-pulse light comprising the upper sideband and lower sideband for demodulating the phase information $\varphi(t)$ and for demodulating the light frequency $I(f)$ intervenes with the local reference light with the polarization state regulated by the tricyclic polarization controller in the 2×2 optical-fiber coupler;

the light signal after interference entering the balanced photoelectric detector for photoelectric conversion and then entering the processing unit for demodulation after the data acquisition in the data acquisition card, and the specific process is as follows:

rapidly separating upper-sideband and lower-sideband interference signals by a digital band-pass filter, wherein the upper-sideband and lower-sideband interference signals are included in the data acquired at the same time;

according to a relational equation $\Delta f/f_0 \approx -0.78\Delta\varepsilon$ of the laser light frequency variation $\Delta f$ and the optical fiber strain variation $\Delta\varepsilon$, an additional phase generated by the frequency shift of the chirped light pulse can be used for compensating the phase generated by the optical fiber under the acoustic strain; therefore, subjecting various filtered sideband time-domain interference signals to Hilbert transform to obtain the corresponding time-domain interference signal envelops; for the imperfect migration of time-domain envelops, performing cross-correlation operation frame by frame by using a signal extraction algorithm based on point-by-point sliding window selection;

integrating x-coordinate position information corresponding to the maximum correlation coefficient in the sliding window calculation so as to obtain the complete phase information of the acoustic strain;

performing Fourier transform to the obtained phase information to obtain the frequency information of the to-be-measured acoustic wave.

Compared with the prior art, the differential COTDR distributed acoustic sensing device and the method based on heterogeneous double-sideband chirped-pulses provided by the invention have the following positive effects:

1. Heterogeneous double-sideband chirped-pulse modulation and coherent light time-domain reflection technology are combined to double the sensitivity of the to-be-measured acoustic wave signal under the condition of not increasing any power consumption through the digital differential calculation method, and to suppress common-mode noise, and the signal-to-noise ratio is significantly improved by the coherent detection technology.

2. Flexibly-controllable heterogeneous double-sideband chirped-pulse light signal is generated by the arbitrary waveform generator and the dual Mach-Zehnder electro-optical modulator, thus providing a convenient and reliable pulse modulation method for different measurement environments.

3. For the imperfect migration of time-domain envelops, the signal extraction algorithm based on point-by-point sliding window selection is used for extracting the details of the to-be-measured acoustic signal. A swept-source is not required for the technology, and thus the measurement time and complexity of the system are significantly reduced. The technology allows the measurement at kHz rate, and mains the reliability for several hours.

REFERENCE TO NUMERALS

Figure 1:
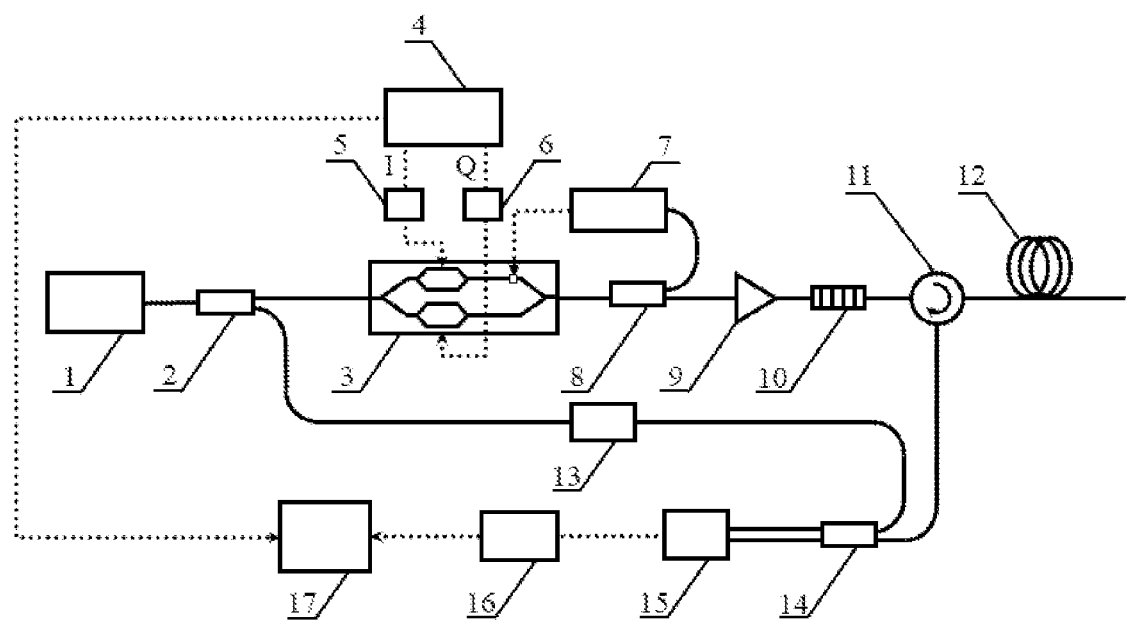
FIG. 1 is a schematic diagram of a differential COTDR distributed acoustic sensing device based on heterogeneous double-sideband chirped-pulses according to the invention.

1. Light source
2. 1×2 polarization-maintaining optical-fiber coupler
3. Dual Mach-Zehnder electro-optical modulator
4. Arbitrary waveform generator
5. First low noise microwave amplifier
6. Second low noise microwave amplifier
7. Electro-optical modulator bias control panel
8. 1×2 optical-fiber coupler
9. Erbium-doped optical-fiber amplifier
10. Optical-fiber filter
11. Optical-fiber circulator
12. Sensing optical fiber
13. Tricyclic polarization controller
14. 2×2 optical-fiber coupler
15. Balanced photoelectric detector
16. Data acquisition card
17. Processing unit.

DETAILED DESCRIPTION OF THE EMBODIMENTS

The technical solution of the invention will be described in detail with reference to accompanying drawings and embodiments.

As shown in FIG. 1, it is a schematic diagram of a differential COTDR distributed acoustic sensing device based on heterogeneous double-sideband chirped-pulses according to the invention. The device comprises a light source 1, a 1×2 polarization-maintaining optical-fiber coupler 2, a dual Mach-Zehnder electro-optical modulator 3, an arbitrary waveform generator 4, a first low noise microwave amplifier 5, a second low noise microwave amplifier 6, and an electro-optical modulator bias control panel 7, a 1×2 optical-fiber coupler 8, an erbium-doped optical-fiber amplifier 9, an optical-fiber filter 10, an optical-fiber circulator 11, a sensing optical fiber 12, a tricyclic polarization controller 13, a 2×2 optical-fiber coupler 14, a balanced photoelectric detector 15, a data acquisition card 16 and a processing unit 17. Therein, the light source 1 emits a continuous laser with a light frequency of $f_0$, and then the continuous laser is divided into two paths after passing the 1×2 polarization-maintaining optical-fiber coupler 2, wherein one path of light is used as a signal light while the other path of light is used as a local reference light. The arbitrary waveform generator 4 generates a heterogeneous digital chirped-pulse electrical-signal with an upper-sideband frequency from $f_{upper}^{start}$ to $f_{upper}^{end}$ and a lower-sideband frequency from $f_{lower}^{start}$ to $f_{lower}^{end}$, and then the electrical signal is divided into two paths of quadrature outputs I and Q and loaded to the dual Mach-Zehnder electro-optical modulator 3 after being amplified by the first low noise microwave amplifier 5 and the second low noise microwave amplifier 6 respectively, so as to modulate and generate a heterogeneous pulse with an upper sideband as a positive chirp and a lower sideband as a negative chirp, which is used as a detection light pulse. The heterogeneous chirped-pulse modulated and generated by the dual Mach-Zehnder electro-optical modulator 3 is divided into two paths by the 1×2 optical-fiber coupler 8, wherein one path of output optical-fiber is connected to the photoelectric detector on the electro-optical modulator bias control panel 7 for extracting and feeding back the modulated heterogeneous chirped pulse light signal, so as to maintain the preset working condition stably for a long time. The other path is used as a detection light pulse and is injected into the sensing optical fiber 12 after successively passing the erbium-doped optical-fiber amplifier 9, the optical-fiber filter 10 and the optical-fiber circulator 11; the heterogeneous chirped pulse light signal generates back Rayleigh scattering light along with the passing optical fiber, which returns to the demodulation light path along with the optical fiber. The back-scattering heterogeneous chirped-pulse light comprising the upper sideband and lower sideband for demodulating the phase information φ(t) and for the demodulating light frequency I(f) intervenes with the local reference light with the polarization state regulated by the tricyclic polarization controller 13 in the 2×2 optical-fiber coupler 14. The light signal after interference enters the balanced photoelectric detector 15 for photoelectric conversion, and then enters the processing unit 17 for demodulation after the data acquisition in the data acquisition card 16.

Embodiment 2: according to a differential COTDR distributed acoustic sensing method based on heterogeneous double-sideband chirped-pulses, a heterogeneous pulse with an upper sideband as a positive chirp and a lower sideband as a negative chirp, generated by the dual Mach-Zehnder electro-optical modulator 3, is used as a detection light pulse and is injected into the sensing optical fiber after being amplified by the erbium-doped optical-fiber amplifier 9; the back-scattering positive and negative chirped-pulse light signals carrying such information as phase, frequency, amplitude, etc. at various positions of the sensing optical fiber 12 are coupled with the reference light signal through the optical-fiber coupler, and the light signal after interference is acquired by the data acquisition card 16 after photoelectric conversion. Due to the counter-movement characteristics of the coherent time-domain envelops of the positive and negative chirped-pulses, the upper-sideband and lower-sideband interference signals are filtered for demodulation by the digital band-pass filter, so as to obtain the waveform information of the acoustic strain position of the sensing optical fiber. At the same time, the sensitivity of the to-be-measured acoustic wave signal is doubled under the condition of not increasing any power consumption through the digital differential calculation method, and the common-mode noise suppression effect is achieved.

The specific steps are as follows:

the light source 1 emits a continuous laser with a light frequency of $f_0$, and then the continuous laser is divided into two paths after passing the 1×2 polarization-maintaining optical-fiber coupler 2, wherein one path of light is used as a signal light while the other path of light is used as a local reference light;

the arbitrary waveform generator 4 generates a heterogeneous digital chirped pulse electrical-signal with an upper-sideband frequency from $f_{upper}^{start}$ to $f_{upper}^{end}$ and a lower-sideband frequency from $f_{lower}^{start}$ to $f_{lower}^{end}$, and then the electrical signal is divided into two paths of quadrature outputs I and Q and loaded to the dual Mach-Zehnder electro-optical modulator 3 after being amplified by the first low noise microwave amplifier 5 and the second low noise microwave amplifier 6 respectively, so as to modulate and generate a heterogeneous pulse with an upper sideband as a positive chirp and a lower sideband as a negative chirp, which is used as a detection light pulse;

the heterogeneous chirped-pulse modulated and generated by the dual Mach-Zehnder electro-optical modulator 3 is divided into two paths by the 1×2 optical-fiber coupler 8, wherein one path of output optical-fiber is connected to the photoelectric detector on the electro-optical modulator bias control panel 7 for extracting and feeding back the modulated heterogeneous chirped-pulse light signal, so as to maintain the preset working condition stably for a long time; the other path is used as a detection light pulse and is injected into the sensing optical fiber after successively passing the erbium-doped optical-fiber amplifier 9, the optical-fiber filter 10 and the optical-fiber circulator 11; the heterogeneous chirped-pulse light signal generates back Rayleigh scattering light along the passing optical fiber, which returns to the demodulation light path along the optical fiber; the back-scattering heterogeneous chirped-pulse light comprising the upper sideband and lower sideband for demodulating the phase information φ(t) and for demodulating the light frequency I(f) intervenes with the local reference light with the polarization state regulated by the tricyclic polarization controller in the 2×2 optical-fiber coupler;

the light signal after interference enters the balanced photoelectric detector 15 for photoelectric conversion and then enters the processing unit 17 for demodulation after the data acquisition in the data acquisition card 16, and the specific process is as follows:

the upper-sideband and lower-sideband interference signals are included in the data acquired at the same time and are rapidly separated by a digital band-pass filter;

according to a relational equation $\Delta f/f_0 \approx -0.78\Delta\varepsilon$ of the laser light frequency variation $\Delta f$ and the optical fiber strain variation $\Delta\varepsilon$, an additional phase generated by the frequency shift of the chirped light pulse can be used for compensating the phase generated by the optical fiber under the acoustic strain; therefore, various filtered sideband time-domain interference signals are subjected to Hilbert transform to obtain the corresponding time-domain interference signal envelops; for the imperfect migration of time-domain envelops, a signal extraction algorithm based on point-by-point sliding window selection is used for performing cross-correlation operation frame by frame;

x-coordinate position information corresponding to the maximum correlation coefficient in the sliding window calculation is integrated to obtain the complete phase information of the acoustic strain;

the obtained phase information is subjected to Fourier transform to obtain the frequency information of the to-be-measured acoustic wave.

Figure 2:
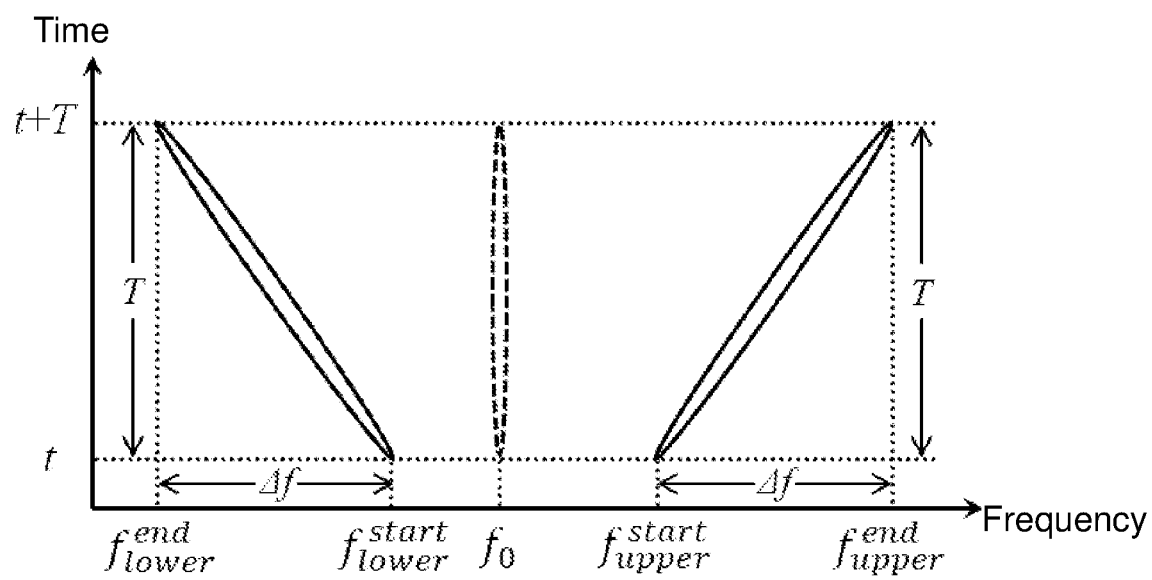
FIG. 2 is a schematic time-frequency curve diagram of heterogeneous double-sideband chirped-pulse light.

As shown in FIG. 2, it is a schematic time-frequency diagram of heterogeneous double-sideband chirped-pulse light. The upper sideband and lower sideband both have linear sweep characteristics within respective pulses, wherein the pulse width is T, the sweep bandwidth is $\Delta f$, the sweep frequency satisfies $f_{upper}^{start} < f_{upper}^{end}$, $f_{lower}^{start} > f_{lower}^{end}$ and the sweep intervals are not overlapped.

Figure 3:
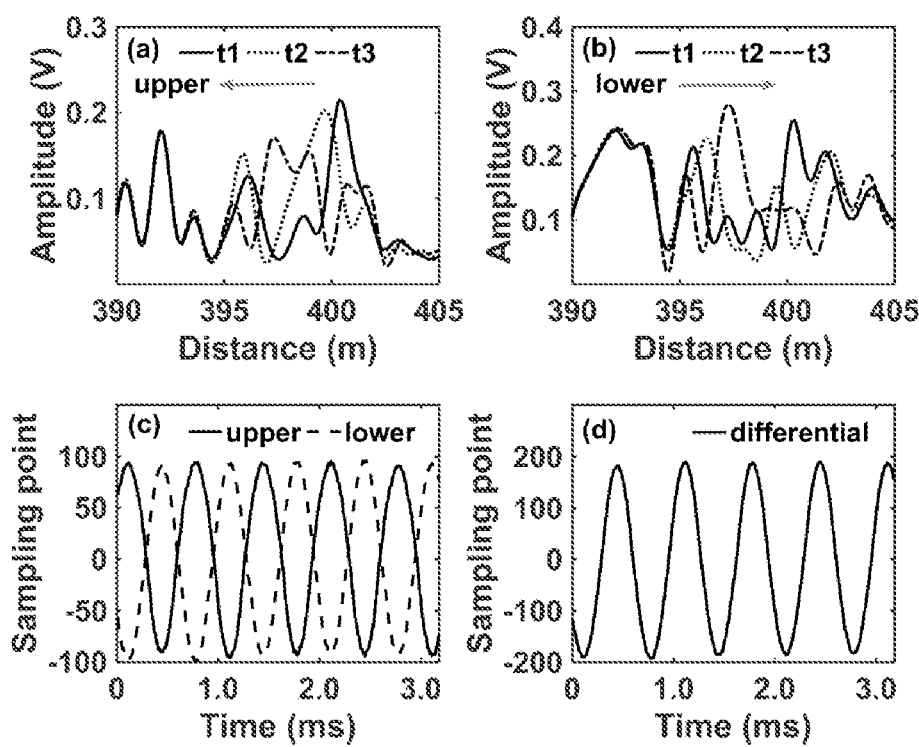
FIG. 3 is schematic diagrams of preliminary experiment results of digital difference of heterogeneous double-sideband chirped-pulse: (a) coherent time-domain envelop of upper-sideband positive chirped-pulse, (b) coherent time-domain envelop of lower-sideband negative chirped-pulse, (c) demodulation results of upper-sideband and lower-sideband, and (d) digital differential demodulation results.

As shown in FIG. 3, it shows schematic diagrams of preliminary experiment results of digital difference of heterogeneous double-sideband chirped-pulse. As shown in (a) and (b) in FIG. 3, the upper-sideband and lower-sideband chirped-pulses modulated and generated at the same time by the dual Mach-Zehnder electro-optical modulator 3 have opposite slopes, and thus the corresponding coherent time-domain envelops have counter-movement characteristics. FIG. 3(a) shows the coherent time-domain envelop of the upper-sideband positive chirped-pulse at three time points $t_1$, $t_2$ and $t_3$ within a half cycle, and the whole envelop presents left migration. FIG. 3(b) shows the coherent time-domain envelop of the lower-sideband negative chirped-pulse at the same three time points, and the envelop presents right migration rule. The upper-sideband and lower-sideband coherent time-domain envelops are processed by the demodulation algorithm provided by the invention, so as to recover the waveform of the to-be-measured signal. The results are as shown in FIG. 3(c). Finally, the upper-sideband and lower-sideband demodulation results are subjected to digital differential calculation for doubling the signal strength, as shown in FIG. 3(d). The results show that the sensitivity of the to-be-measured acoustic wave signal is doubled under the condition of not increasing any power consumption through a digital differential calculation method, and the common-mode noise suppression effect is achieved.

What is claimed is:

1. A differential COTDR distributed acoustic sensing device based on heterogeneous double-sideband chirped-pulses, comprising a light source (1), a 1×2 polarization-maintaining optical-fiber coupler (2), a dual Mach-Zehnder electro-optical modulator (3), an arbitrary waveform generator (4), a first low noise microwave amplifier (5), a second low noise microwave amplifier (6), an electro-optical modulator bias control panel (7), a 1×2 optical-fiber coupler (8), an erbium-doped optical-fiber amplifier (9), an optical-fiber filter (10), an optical-fiber circulator (11), a sensing optical fiber (12), a tricyclic polarization controller (13), a 2×2 optical-fiber coupler (14), a balanced photoelectric detector (15), a data acquisition card (16) and a processing unit (17);

the light source (1) being connected with an input end of the 1×2 polarization-maintaining optical-fiber coupler (2); the 1×2 polarization-maintaining optical-fiber coupler (2) comprising two output ends, one output end being connected with the dual Mach-Zehnder electro-optical modulator (3), the 1×2 optical-fiber coupler (8), the erbium-doped optical-fiber amplifier (9) and the optical-fiber filter (10) in turn, the other output end being connected with the tricyclic polarization controller (13), the 2×2 optical-fiber coupler (14) and the balanced photoelectric detector (15) in turn, and then the two output ends being connected with the optical-fiber circulator (11) and the sensing optical fiber (12) in turn through a common output end;

dividing the output end of the 1×2 optical-fiber coupler (8) into two paths, one path of the output end being connected with a photoelectric detector on the electro-optical modulator bias control panel (7);

the arbitrary waveform generator (4) being used for generating a heterogeneous digital chirped-pulse electrical-signal with an upper-sideband frequency from $f_{upper}^{start}$ to $f_{lower}^{start}$ and a lower-sideband from $f_{lower}^{start}$ to $f_{lower}^{end}$, which is divided into two paths of quadrature outputs I and Q, and the output data entering the processing unit;

the electro-optical modulator bias control panel being used for extracting and feeding back the modulated heterogeneous chirped-pulse light signals so as to main a preset working condition stably for a long time;

the first low noise microwave amplifier (5) and the second low noise microwave amplifier (6) being used for amplifying the two paths of quadrature outputs I and Q and then loading to the dual Mach-Zehnder electro-optical modulator (3) respectively, so as to modulate and generate a heterogeneous pulse with an upper sideband as a positive chirp and a lower sideband as a negative chirp, which is used as a detection light pulse;

the balanced photoelectric detector (15) being connected with the data acquisition card (16), and the data acquired by the data acquisition card (16) entering the processing unit (17).

2. A differential COTDR distributed acoustic sensing method based on heterogeneous double-sideband chirped-pulses, comprising the following steps:

by a light source, emitting a continuous laser with a light frequency of $f_0$, and the dividing the continuous laser into two paths after passing the 1×2 polarization-maintaining optical-fiber coupler, wherein one path of light is used as a signal light while the other path of light is used as a local reference light;

by an arbitrary waveform generator, generating a heterogeneous digital chirped-pulse electrical-signal with an upper-sideband frequency from $f_{upper}^{start}$ to $f_{upper}^{end}$ and a lower-sideband frequency from $f_{lower}^{start}$ to $f_{lower}^{end}$, and then dividing a electrical signal into two paths of quadrature outputs I and Q and loading to a dual Mach-Zehnder electro-optical modulator after being amplified by a first low noise microwave amplifier and a second low noise microwave amplifier respectively, so as to modulate and generate a heterogeneous pulse with an upper sideband as a positive chirp and a lower sideband as a negative chirp, which is used as a detection light pulse;

dividing a heterogeneous chirped-pulse into two paths by a 1×2 optical-fiber coupler, wherein one path of output optical-fiber is connected to the photoelectric detector on the electro-optical modulator bias control panel for extracting and feeding back the modulated heterogeneous chirped-pulse light signal, so as to maintain the preset working condition stably for a long time; the other path is used as a detection light pulse and is injected into the sensing optical fiber after successively passing the erbium-doped optical-fiber amplifier, the optical-fiber filter and the optical-fiber circulator;

by the heterogeneous chirped-pulse light signal, generating back Rayleigh scattering light along the passing optical fiber and returning to a demodulation light path along the optical fiber; and the back-scattering heterogeneous chirped-pulse light comprising the upper sideband and lower sideband for demodulating the phase information $\varphi(t)$ and for demodulating the light frequency $I(f)$ intervenes with the local reference light with the polarization state regulated by the tricyclic polarization controller in the 2×2 optical-fiber coupler;

the light signal after interference entering the balanced photoelectric detector for photoelectric conversion and then entering the processing unit for demodulation after the data acquisition in the data acquisition card, and the specific process is as follows:

rapidly separating upper-sideband and lower-sideband interference signals by a digital band-pass filter, wherein the upper-sideband and lower-sideband interference signals are included in the data acquired at the same time;

subjecting various filtered sideband time-domain interference signals to Hilbert transform to obtain the corresponding time-domain interference signal envelops; for the imperfect migration of time-domain envelops, performing cross-correlation operation frame by frame by using a signal extraction algorithm based on point-by-point sliding window selection;

integrating x-coordinate position information corresponding to the maximum correlation coefficient in the sliding window calculation so as to obtain the complete phase information of the acoustic strain;

performing Fourier transform to the obtained phase information to obtain the frequency information of the to-be-measured acoustic wave.

* * * * *